United States Patent [19]

Romano

[11] 4,047,055

[45] Sept. 6, 1977

[54] LINE CONTROL UNIT FOR TELEPRINTERS

[75] Inventor: Antonio Romano, Ivrea (Turin), Italy

[73] Assignee: Ing. C. Olivetti & C., S.p.A., Ivrea (Turin), Italy

[21] Appl. No.: 632,909

[22] Filed: Nov. 18, 1975

[30] Foreign Application Priority Data

Dec. 24, 1974 Italy .................................. 70739/74

[51] Int. Cl.$^2$ .............................................. H03K 5/01

[52] U.S. Cl. ...................................... 307/262; 178/68; 179/2 R; 307/270; 307/311

[58] Field of Search ......................... 178/68; 179/2 R; 307/202, 262, 243, 270, 311, 250

[56] References Cited

U.S. PATENT DOCUMENTS

| | | | |
|---|---|---|---|
| 3,359,433 | 12/1967 | Thauland | 307/262 X |
| 3,555,358 | 1/1971 | Gibbs | 307/202 X |

*Primary Examiner*—John Zazworsky

[57] ABSTRACT

In a line control unit for teleprinters, a pair of isolating circuits are disposed between the line transistors and the generating circuit, so that there is no electrical connection between the line and the signal generator circuit. The generating circuit is coupled to each isolating circuit by a delay circuit which delays only the edges of the corresponding switching signal at which the corresponding transistor turns from the blocked to the conductive state, whereby the conduction of each transistor is delayed while the other transistor recovers to its blocked state.

2 Claims, 3 Drawing Figures

SIG. GEN.
G
+VC
+V1
V+
+V2
0V1
0V
0V2
V-

LINE CONTROL UNIT FOR TELEPRINTERS

BACKGROUND OF THE INVENTION

1. Field of Invention

The present invention relates to a line control unit for teleprinters, comprising a circuit for generating switching signals, a pair of transistors connected to sources of positive and negative voltage, respectively, and furthermore interconnected at a point common to the line to supply selectively on the line a positive and negative current, respectively, and a pair of isolating circuits disposed between the transistors and the generating circuit so that there is no electrical connection between the line and the generating circuit.

2. Description of the Prior Art

As is known, one of the main functions performed by a line control unit is that of effecting electrical isolation between the teleprinter apparatus and the telegraphic line. In known line control units, this function has been performed by decoupling relays driven by the signals issuing from the teleprinter and generating the line signals. In more modern line control units, the relays have been replaced by optoelectronic couplers which are formed by a photoemissive diode and photosensitive transistor coupled optically to the diode. The photosensitive transistor is connected to an amplifier which drives a line transistor. More particularly, in a double-current line, the line current is modulated from a negative value to a positive value in correspondence with each information bit, for example from −25mA to +25mA.

SUMMARY OF THE INVENTION

The switching is obtained by means of two line transistors disposed in series between sources of positive and negative voltages of equal magnitude. The line is formed by two wires, one of which is connected to the intermediate point between the two line transistors; the other line wire is connected to the electrical zero of the sources of the positive and negative voltages.

In such line control units, there is the disadvantage that the power transistors connected to the line may be damaged by the high reverse voltages to which they are alternately subjected at the instant of switching.

In fact, the power transistors normally have a recovery time greater than the rise time of the edge of the signal sent to the line, as a result of which, before each line transistor passes into the blocked state it continues to conduct throughout the recovery time following the switching signal. Consequently, it is traversed by a very high reverse current proportional to the voltage present across its terminals, with consequent tendency to burn-out the junctions.

According to the present invention, there is provided a line control unit for teleprinters of the type specified, wherein the generating circuit is coupled to each isolating circuit by a delay circuit which delays only the edges of the corresponding switching signal at which the corresponding transistor turns from the blocked to the conductive state, whereby the conduction of each transistor is delayed while the other transistor recovers to its blocked state.

BRIEF DESCRIPTION OF THE DRAWINGS

The invention will be described in more detail, by way of example, with reference to the accompanying drawings, in which.

DETAILED DESCRIPTION OF THE INVENTION

Figure 3:
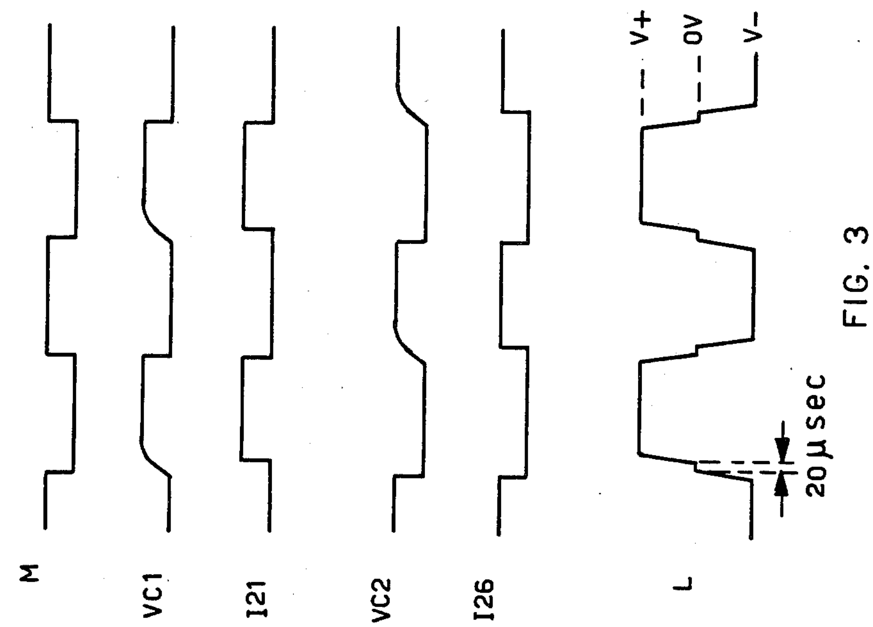
FIG. 3 is a diagram of some signals present in the circuits.
Figure 1:
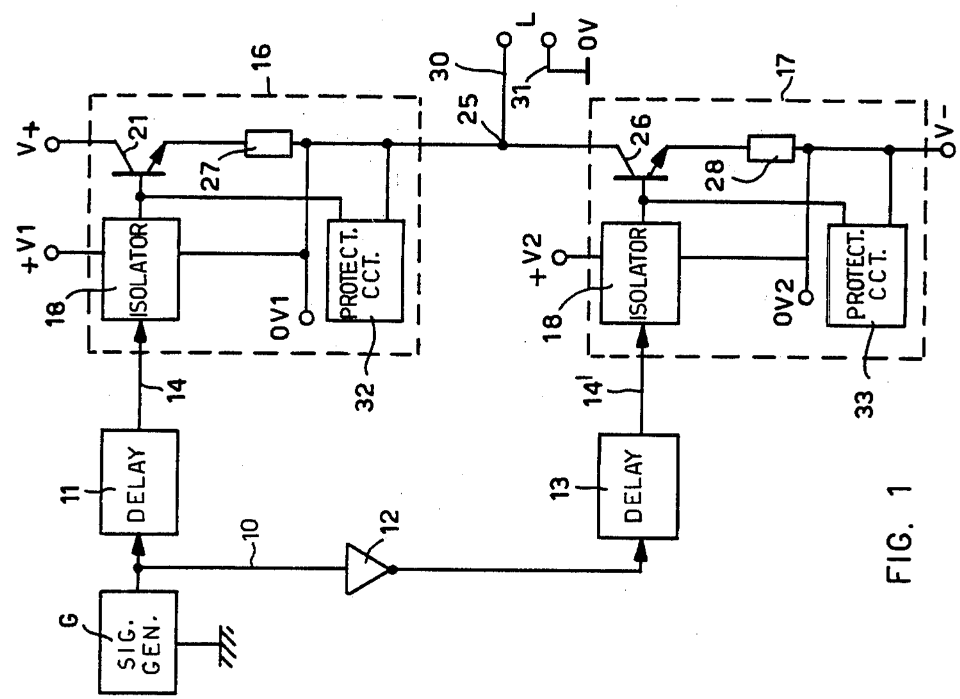
FIG. 1 is a block diagram of a line control unit embodying the invention.

Referring to FIG. 1, on an input conductor 10 there is present a switching signal M generated by a generator G and which represents in the telegraph code the message to be transmitted on the line L and the form of which is shown in FIG. 3.

The signal M is applied to a first delay circuit 11 and, after being inverted in an inverter 12, to a second delay circuit 13.

The outputs 14 and 14' of the two delay circuits 11 and 13 are connected to two circuits 16 and 17 for output on the line L. Since these circuits equivalent to one another, only the circuit 16 will be described.

The circuit 16 includes a device 18 commonly called an optoelectronic isolator, which is formed by a photoemissive diode 19 and photosensitive transistor 20 (FIG. 2) which may be contained in a single housing. The anode of the diode 19 (FIG. 2) is connected to the +VC source by means of a resistor 22 (23 in the block 17) for limiting the current flowing in the diode 19 when the signal at the output of the inverter 6 is low. The output of the isolator 18 drives the base of an output transistor 21, the collector of which is connected to a voltage source V+ and the emitter of which is connected to a point 25 via a resistor 27. Similarly, the output transistor 26 of the circuit 17 of FIG. 1 has its collector connected to the point 25 and its emitter connected to a voltage source V− via a resistor 28.

The point 25 is connected to one conductor 30 of the line L. The other conductor 31 of the line L is connected to the electrical zero OV of the sources V+ and V−. The circuit 16 moreover includes a protective circuit 32 (33 in the circuit 17).

Figure 2:
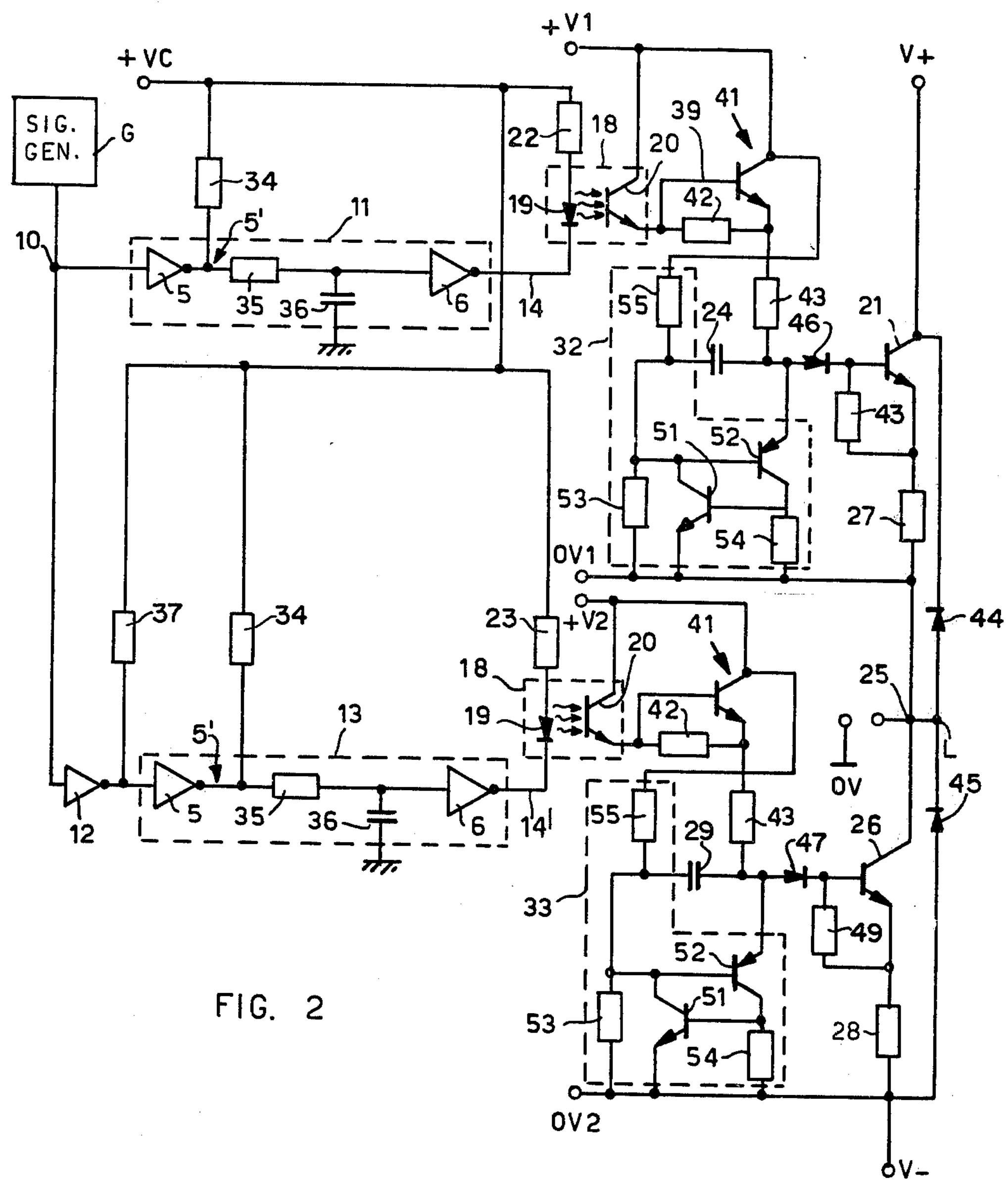
FIG. 2 is a detailed diagram of the circuit of the line control unit.

A more detailed description of the circuit of the control unit will now be given with reference to FIGS. 2 and 3. Each delay circuit 11 and 13 comprises an inverter amplifier 5 in series with an R-C network composed of a series resistor 35 and a shunt capacitor 36. A resistor 34 is connected between a DC current source +VC and the output 5' of the inverter amplifier 5. A squaring amplifier 6 is connected in series with the inverter 5 and the resistor 35 at the output from the circuit 11.

The values of the R-C network are chosen so as to introduce a delay of about 20 $\mu$ sec. This delay in the circuit 11 affects the falling edges of the signal M and delays turn-on of the transistor 21. In the circuit 13, the delay affects the falling edges of M inverted, i.e. the rising edges of M, and delays turn-on of the transistor 26.

The output conductor 14 from the delay circuit 11 is connected to the photoemissive diode 19. The output of the isolator 18 is constituted by the emitter of the transistor 20, which is connected to the input 39 of a driving amplifier constituted by an emitter follower transistor 41 and the resistors 42 and 43, which provide for amplifying the signal present at the input 39 for driving the line transistors 21 and 26. Protective diode 46 is connected between the resistor 43 in protective circuit 32 and the base of transistor 21 and protective diode 47 is connected between the resistor 43 in protective circuit 33 and the base of transistor 26. A biasing resistor 48 and a biasing resistor 49 are respectively connected between the base and the emitter of transistors 21 and 26. The protective diodes 46 and 47 and the biasing resistors 48 and 49 are auxiliary components which function in a manner well known in the art. These components do not perform any essential function in the transmission of the signals of the present invention.

The protective circuit 32 is constituted by two transistors 51 and 52 and the resistors 53, 54 and 55 connected in known SCS configuration. The lower taps of resistors 43 and 55 are connected to a capacitor 24 (29 in block 17) for decoupling the protective circuits 32 and 33 from the transistors 21 and 26, respectively. Two diodes 44 and 45 are connected in series between the sources V− and V+ with their common point connected to the line L for preventing overvoltage from being applied to the transistors 21, 26.

The line control unit operates in the following manner. The signal M generated by the generator G is applied to the delay circuit 11 which, by means of the R-C network contained therein, modifies the falling edge of the signal M, introducing a delay of about 20 $\mu$ sec. In fact, when the output of the inverter 5 goes high, the capacitor 36 is charged by the + VC voltage through the series resistors 34 and 35, reaching its high level only after its rise time. This rise time is determined by the product of the capacitance of capacitor 36 and the series resistance of series resistors 34 and 35. On the other hand, the fall time of signal M is different than the rise time because, when the output of the inverter 5 goes low, the capacitor 36 is discharged only through the resistor 35. The dropping or fall time of this signal is equal to the product of the capacitance of capacitor 36 and the resistance of the resistor 35. Of course, this product is always less than the product of the capacitance of capacitor 36 and the series resistance of series resistors 34 and 35 which is used to determine the rise time. Across the terminals of the capacitor 36, the signal VC1 has then the form indicated in FIG. 3. Before being sent on the output wire 14 from the circuit 11, the signal is squared by the squaring amplifier 6, which has the function of reconstructing the wave fronts of the signal VC1 with the slope suitable to be applied to the following stages 18 and 41. The square signal is represented as I21 in FIG. 3.

The signal is applied on the wire 14 to the photoemissive diode 19, which excites the phototransistor 20 optically, this passing into the saturated state. Consequently, the transistor 41 is saturated and sends the driving current to the base of the transistor 21, which pases from the blocked state to the saturated state, thus connecting the line L to the source V+.

The signal M is processed in an entirely similar manner in the circuit marked 17, except that the inverter 12 which is normally biased by a resistor 37 connected between the +VC voltage and the output of the inverter 12, inverts the polarity of the signal M before sending it to the delay circuit 13. Hence the signal across capacitor 36 in delay circuit 13 appears as VC2 (FIG. 3). This signal is squared by the inverter 6 for rendering it suitable to be applied to the following stages 18, 41. The transistor 41 applies to the base of transistor 26 a control signal represented by 126 in FIG. 3. At the point L, the switching signals processed in the circuits 16 and 17 of FIG. 1 are combined together by the transistors 21 and 26 and give rise to the line signal indicated by the waveform L in FIG. 3.

The protective circuits 32 and 33 protect the line transistors 21 and 26 from possible unbalances due to the connecting line L. If a short circuit occurs on the line L, the strong current that flows produces a voltage drop at the resistors 27 and 28. This voltage drop is carried back to the base of the line transistors, which are instantaneously put into the blocked state, thus blocking the current passing through them.

At the same time, the transistor 52, which normally conducts a limited current, because of the increase in voltage across the terminals of the resistor 27, conducts much more, causing saturation of the transistor 51, which, in turn definitively saturates the transistor 52, which consequently keeps the transistor 21 blocked.

The protective circuit remains effective until such time as the signal I21 present at the lower terminal of the resistor 43 is changed over. To avoid further disturbances originating from the line L causing a change in the operation of the protective circuit, a so-called fluctuating feed voltage +V1 for the protective circuit is provided. In fact, the voltage +V1 is referenced to the voltage OV1 which is connected to the line L.

While in accordance with the provisions and statutes there has been illustrated and described the best form of the invention known, certain changes may be made to the described circuit without departing from the spirit and scope of the invention as set forth in the appended claims.

What I claim is:

1. Line control unit for teleprinters for a double-current line, comprising:

a circuit for generating switching signals, a first pair of line transistors connected to a source of positive and negative voltages, respectively, and furthermore interconnected at a point common to the said line to supply selectively on said line a positive and negative current, respectively, a pair of isolating circuits disposed between said line transistors and said generating circuit for galvanically isolating said line from said generating circuit, a pair of delay circuits arranged between said generating circuit and said isolating circuits, for delaying the edges of the switching signals at which said line transistors respectively turn from the blocked state to the conductive state.

2. Line control unit as in claim 1, moreover including a protective circuit for the line transistors constituted by a second pair of transistors connected as emitter followers and fed with a voltage related directly to the line voltage, whereby when the current flowing in the line exceeds a predetermined value the protective circuit brings said first pair of line transistors to the blocked state and keeps them therein until the following switching operation.

* * * * *